UNITED STATES PATENT OFFICE.

NICOLAI WASILIEVITCH TURKIN, OF MOSCOW, RUSSIA.

PRINTING-SURFACE FOR COLOR-PRINTING.

1,164,037. Specification of Letters Patent. Patented Dec. 14, 1915.

No Drawing. Application filed January 12, 1914. Serial No. 811,552.

*To all whom it may concern:*

Be it known that I, NICOLAI WASILIEVITCH TURKIN, a subject of the Czar of Russia, residing at Moscow, Russia, have invented certain new and useful Improvements in Printing-Surfaces for Color-Printing, of which the following is a specification.

This invention is for improvements in or relating to printing surfaces for color printing purposes for the manufacture of which there are employed coloring matters of the kind described in the specification of my copending application Serial No. 811,173, filed January 9, 1914.

According to the process described in the specification of my co-pending application referred to above, coloring matters or dyestuffs suitable for any desired painting or printing purposes are obtained from any desired color pigments by completely dissolving the same in a suitable carrier, the base of which is alizarin (Turkey red) oil, so as to produce a colloidal solution of the pigment therein. The pigment carrier is preferably prepared by heating together alizarin (Turkey red) oil, and either or both basic aluminium acetate and/or salts of metals of the alkaline earths or alkalis, so as to produce a composition insoluble in water; with this carrier the pigment is incorporated and according to circumstances naphthalene and other substances can be added to the product all as described in the specification of my aforementioned co-pending application 811,173 filed January 9, 1914.

According to the present invention a printing surface for color printing purposes is composed of a composition of matter consisting of a color pigment colloidally distributed in a carrier having a base of alizarin oil, the said carrier being insoluble in water.

A further feature of this invention consists in forming a printing surface for color printing purposes of printing elements such as pins or plates of the previously mentioned composition containing coloring matter.

For the manufacture of a red color suitable for printing purposes there are first of all prepared three mixtures consisting of:—
1. 100 gms. basic aluminium acetate and 200 gms. alizarin (Turkey red) oil. 2. 10 gms. Biebrich scarlet and 100 gms. alizarin (Turkey red) oil. 3. 20 gms. naphthalene and 20 gms. fish (train) oil. These three mixtures are combined together, and a mixture of resins, consisting of 50 gms. Canada balsam, 250 gms. Venetian turpentine, 100 gms. copal resin, 50 gms. pine resin, 25 gms. elemi resin, 50 gms. shellac, is added to it, with constant stirring and heating. Moreover, 25 gms. glucose, previously mixed if desired with powdered resins, are added to the mass. The mass is again boiled, until it becomes solid on cooling. With this coloring mass is combined a thick fluid resin mixture previously prepared by mixing 125 gms. fish (train) oil, 650 gms. copal resin with 225 gms. spirits of wine (95%) or some other (preliminary) solvent, and boiling the mixture in question. In the event of the mass being too solid for treatment, some solvent, such as for instance toluol, can be added to it, until it acquires the desired consistency. In the same way any desired color pigment can be introduced into the same or a similar carrier substance.

Throughout this specification, alizarin oil is used to denote the neutralized products obtained by treating with sulfuric acid not only olive oil, but also other oils, such for example as castor oil, cotton seed oil and other oils containing glycerids of palmitic acid, oleic acid, etc.

Color bodies obtained in the manner described by dissolving pigments in lake-like masses, can be utilized for obtaining impressions in several colors from a single block, the colors in question being put on in the arrangement or pattern required for the printing, on a single printing plate, and for the purpose of printing, moistened with a solvent for the pigment carrier. The application of the various colors to the printing plate can be effected either in the ordinary well known manner, that is by putting them on a printing plate in accordance with the desired color pattern, by means of a brush, spatula or the like, or by forming the desired color pattern in the same way as mosaics, from color bars or plates. When such mosaic-like arrangement of color bars is used, the said bars could be introduced into a printing frame, in the same way as printing type is set by type-setting machines, by machines analogous to the latter. Whatever method be adopted however for preparing the printing plates or blocks it is essential for insuring a good result, that the color bodies arranged next to each other should be of such a nature that, even when a solvent for the pigment carrier is put on, they should not diffuse into each other, or diffuse only to such extent as may be desired in each separate case.

In certain circumstances it may be desired to produce a diffusion up to a certain degree, in order to soften the gradation of colors. This can be effected by moistening the adjoining surfaces of the different colored color zones with essential oils, such for example is aniseed oil, lemon oil, and the like. Conversely the capacity of diffusion of the adjoining color layers can be destroyed by providing the surfaces of the said adjoining color layers with a coating of alizarin (Turkey red) oil and ammonia.

Owing to the fact that the pigment is colloidally dissolved in the color carrier it becomes possible to carry out color printing by simply moistening the color coating with a solvent for the carrier inclosing the pigment, as the carrier and a greater or smaller quantity of pigment dissolved in the same are simultaneously removed by solution.

For the purpose of printing, the color is placed on a suitable printing surface, or pin- or plate-like bodies are prepared from the same, the end surfaces of which correspond to the color patches to be printed, while the sides are bounded by cylindrical surfaces. The color pins can be put together so as to form any desired patterns, in the manner analogous to the setting of types, by means of devices corresponding to type-setting machines. The single type-bars (or elements) can be obtained from color bars or threads, by cutting them off from the latter. The control of such a color bar setting machine can be effected by means of pattern cards, in the same way as used in the so-called Jacquard weaving looms.

A suitable solvent for the coloring matter when printing from blocks provided with one color layer, can be obtained in the following manner: By way of example, the following mixture is prepared: 75 gms. spirits of wine (95%), 155 gms. spirits of lavender, 40 gms. alizarin (Turkey red) oil, 150 gms. methyl alcohol, 120 gms. toluol, 10 gms. xylol, 15 gms. paraffin in the form of a solution in xylol and of the consistency of milk, 190 gms. glacial acetic acid, 40 gms. petroleum ether, 25 gms. sulfuric ether, 50 gms. acetic ether, 40 gms. creosote, 75 gms. ammonia (25%), 15 gms. of an alcohol solution, of milk consistency, of equal quantities of copal resin and fish (train) oil are all boiled together. The last mentioned mixture is used for moistening the color coating on the blocks for the purpose of producing impressions on paper, fabric or other background. This can be effected by moistening, with the solution in question, the surfaces on which the printing is to be done, and in that way bringing about indirectly a moistening of the printing blocks.

What I claim as my invention and desire to secure by Letters Patent is:—

1. A printing surface for color printing purposes, comprising a colloidal solution of a color pigment in a composition of matter having a base of alizarin oil, the said composition being insoluble in water.

2. A printing surface for color printing purposes, comprising a composition of matter produced by forming a colloidal solution of a color pigment by heating the color pigment with alizarin oil and metallic salts until the whole solidifies on cooling.

3. A printing surface for color printing purposes, comprising a composition of matter produced by forming a colloidal solution of a color pigment by heating the color pigment with alizarin oil and basic aluminum acetate until the whole solidifies on cooling.

4. A printing surface for color printing purposes, comprising a composition of matter produced by forming a colloidal solution of a color pigment by heating the color pigment with alizarin oil, basic aluminum acetate and naphthalene until the whole solidifies on cooling.

5. A printing surface for color printing purposes, comprising printing elements formed of a colloidal solution of a color pigment in a composition of matter having a base of alizarin oil, the said composition being insoluble in water.

6. A printing surface for color printing purposes, comprising printing elements formed of a colloidal solution of a color pigment in a composition of matter having a base of alizarin oil and metallic salts, the said composition being insoluble in water.

7. A printing surface for color printing purposes, comprising printing elements formed of a colloidal solution of a color pigment in a composition of matter having a base of alizarin oil and basic aluminum acetate, the said composition being insoluble in water.

8. A printing surface for color printing purposes, comprising printing elements formed of a colloidal solution of a color pigment in a composition of matter having a base of alizarin oil, basic aluminum acetate and naphthalene, the said composition being insoluble in water.

In testimony whereof I have signed my name to this specification in the presence of two subscribing witnesses.

NICOLAI WASILIEVITCH TURKIN.

Witnesses:
CHRISTIAN ERFURT,
LYDIA RÖLL.